(12) United States Patent
Tang et al.

(10) Patent No.: US 7,864,454 B1
(45) Date of Patent: Jan. 4, 2011

(54) IMAGING LENS SYSTEM

(75) Inventors: Hsiang-Chi Tang, Taichung (TW);
Chun-Shan Chen, Taichung (TW);
Ming-Ching Lin, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/591,468

(22) Filed: Nov. 20, 2009

(30) Foreign Application Priority Data

Aug. 11, 2009 (TW) ............................... 98126907 A

(51) Int. Cl.
*G02B 9/60* (2006.01)
*G02B 9/02* (2006.01)
(52) U.S. Cl. ...................... 359/764; 359/714; 359/765; 359/766
(58) Field of Classification Search ................. 359/714, 359/763, 764, 765, 766
See application file for complete search history.

(56) References Cited

U.S. PATENT DOCUMENTS 7,365,920 B2 4/2008 Noda
7,502,181 B2 * 3/2009 Shinohara ................... 359/764

* cited by examiner

Primary Examiner—Jack Dinh
(74) Attorney, Agent, or Firm—Bacon & Thoms, PLLC

(57) ABSTRACT

The present invention provides an imaging lens system comprising, in order from an object side to an image side: a first lens element with positive refractive power having a convex object-side surface; a second lens element with negative refractive power; a third lens element with positive refractive power, at least one of the object-side and image-side surfaces thereof being aspheric; a fourth lens element, the image-side surface thereof being aspheric and provided with at least one inflection point; a fifth lens element having a concave object-side surface, at least one of the object-side and image-side surfaces thereof being aspheric; and an aperture stop disposed between an imaged object and the second lens element. Such an arrangement of optical elements can effectively reduce the total track length and sensitivity of the optical system, and image quality can also be improved.

20 Claims, 17 Drawing Sheets

| TABLE 1 | | | | | | | |
|---|---|---|---|---|---|---|---|
| (Embodiment 1) | | | | | | | |
| f = 4.31 mm, Fno = 2.85, HFOV = 33.9 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.013 | | | | |
| 2 | Lens 1 | 1.76600 (ASP) | 0.636 | Plastic | 1.544 | 55.9 | 3.12 |
| 3 | | -36.90680 (ASP) | 0.136 | | | | |
| 4 | Lens 2 | -13.88090 (ASP) | 0.312 | Plastic | 1.632 | 23.4 | -6.16 |
| 5 | | 5.45680 (ASP) | 0.931 | | | | |
| 6 | Lens 3 | -2.10325 (ASP) | 0.407 | Plastic | 1.544 | 55.9 | 14.40 |
| 7 | | -1.77135 (ASP) | 0.050 | | | | |
| 8 | Lens4 | 1.72865 (ASP) | 0.631 | Plastic | 1.544 | 55.9 | 60.44 |
| 9 | | 1.58985 (ASP) | 0.510 | | | | |
| 10 | Lens5 | -57.00100 (ASP) | 0.549 | Plastic | 1.583 | 30.2 | -7.82 |
| 11 | | 4.97820 (ASP) | 0.300 | | | | |
| 12 | IR-filter | Plano | 0.400 | Glass | 1.517 | 64.2 | - |
| 13 | | Plano | 0.253 | | | | |
| 14 | Image | Plano | | | | | |

Fig.9

| TABLE 2 | | | | | |
|---|---|---|---|---|---|
| Aspheric Coefficients | | | | | |
| Surface # | 2 | 3 | 4 | 5 | 6 |
| k = | -3.36023E-01 | -2.89556E+02 | 1.89850E+02 | 1.00604E+01 | -1.72027E+01 |
| A4 = | -2.35185E-03 | -4.44230E-02 | -1.92983E-02 | 3.33608E-02 | 1.54344E-02 |
| A6 = | 1.28721E-02 | -2.76747E-02 | -3.96324E-02 | -4.43290E-02 | -3.76453E-02 |
| A8 = | -2.16258E-02 | 7.29300E-03 | 2.61897E-02 | 4.15247E-02 | 2.51528E-02 |
| A10= | -4.49702E-03 | 1.55459E-02 | 5.90912E-02 | -4.47111E-03 | -8.12481E-03 |
| A12= |  | 1.35582E-03 | 2.96697E-03 | 1.61684E-02 | -2.52200E-03 |
| Surface # | 7 | 8 | 9 | 10 | 11 |
| k = | -9.81773E-01 | -8.61296E+00 | -3.75996E+00 | -1.75913E+02 | -3.28042E-01 |
| A4 = | 1.10696E-03 | -9.04269E-02 | -6.24714E-02 | -8.07215E-03 | -4.67164E-02 |
| A6 = | 2.96193E-02 | 1.30237E-02 | 1.26887E-02 | 8.48626E-04 | 2.81014E-03 |
| A8 = | -4.00060E-03 | 2.26884E-03 | -1.99542E-03 | -2.95793E-04 | 7.46621E-04 |
| A10= | -3.74913E-04 | -5.57978E-04 | 2.77903E-05 | 5.37594E-06 | -1.07033E-04 |
| A12= | 7.18921E-05 | 1.61249E-06 | 6.00347E-06 |  | -2.93947E-07 |
| A14= |  |  |  |  | 2.33812E-07 |

Fig.10

| TABLE 3 | | | | | | | |
|---|---|---|---|---|---|---|---|
| (Embodiment 2) | | | | | | | |
| f = 4.46 mm, Fno = 2.78, HFOV = 33.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.080 | | | | |
| 2 | Lens 1 | 1.75541 (ASP) | 0.627 | Plastic | 1.544 | 55.9 | 3.06 |
| 3 | | -28.32860 (ASP) | 0.141 | | | | |
| 4 | Lens 2 | -12.44190 (ASP) | 0.310 | Plastic | 1.632 | 23.4 | -6.11 |
| 5 | | 5.65620 (ASP) | 0.969 | | | | |
| 6 | Lens 3 | -2.22833 (ASP) | 0.370 | Plastic | 1.544 | 55.9 | 13.24 |
| 7 | | -1.80140 (ASP) | 0.050 | | | | |
| 8 | Lens4 | 2.03602 (ASP) | 0.609 | Plastic | 1.544 | 55.9 | -88.02 |
| 9 | | 1.74714 (ASP) | 0.447 | | | | |
| 10 | Lens5 | -50.00270 (ASP) | 0.745 | Plastic | 1.583 | 30.2 | -8.1 |
| 11 | | 5.25090 (ASP) | 0.300 | | | | |
| 12 | IR-filter | Plano | 0.400 | Glass | 1.517 | 64.2 | - |
| 13 | | Plano | 0.244 | | | | |
| 14 | Image | Plano | | | | | |

Fig.11

| TABLE 4 | | | | | |
|---|---|---|---|---|---|
| Aspheric Coefficients | | | | | |
| Surface # | 2 | 3 | 4 | 5 | 6 |
| k = | -2.95046E-01 | -2.98548E+02 | 1.48063E+02 | 6.47796E+00 | -1.41087E+01 |
| A4 = | -7.67074E-04 | -3.85532E-02 | -1.55766E-02 | 2.61170E-02 | 9.18377E-03 |
| A6 = | 7.45372E-03 | -3.20701E-02 | -3.95270E-02 | -3.42026E-02 | -3.48626E-02 |
| A8 = | -2.41701E-02 | 1.84820E-03 | 2.79441E-02 | 4.64932E-02 | 2.70673E-02 |
| A10= | 3.67001E-03 | 1.58100E-02 | 6.32449E-02 | -1.12686E-02 | -1.10018E-02 |
| A12= | | 1.35563E-02 | -1.35990E-03 | 1.68540E-02 | -1.93478E-03 |
| Surface # | 7 | 8 | 9 | 10 | 11 |
| k = | -9.98824E-01 | -1.08738E+01 | -3.39117E+00 | -2.99473E+02 | -2.15779E+00 |
| A4 = | 1.81629E-03 | -8.60343E-02 | -7.04228E-02 | -1.10437E-02 | -4.50837E-02 |
| A6 = | 3.73949E-02 | 1.28387E-02 | 1.35632E-02 | 5.48040E-04 | 2.79505E-03 |
| A8 = | -5.83402E-03 | 1.85880E-03 | -2.18057E-03 | -2.57303E-04 | 8.22227E-04 |
| A10= | -6.53488E-04 | -6.01977E-04 | -3.38558E-05 | 1.32058E-05 | -1.15953E-04 |
| A12= | 2.19533E-04 | 2.06532E-05 | 1.55827E-05 | | -1.06607E-06 |
| A14= | | | | | 3.24105E-07 |

Fig.12

| TABLE 5 | | | | | | |
|---|---|---|---|---|---|---|
| (Embodiment 3) | | | | | | |
| f = 5.33 mm, Fno = 2.90, HFOV = 33.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.150 | | | | |
| 2 | Lens 1 | 1.99306 (ASP) | 0.652 | Plastic | 1.544 | 55.9 | 3.43 |
| 3 | | -25.78100 (ASP) | 0.295 | | | | |
| 4 | Lens 2 | -6.34730 (ASP) | 0.315 | Plastic | 1.632 | 23.4 | -6.34 |
| 5 | | 11.07940 (ASP) | 0.899 | | | | |
| 6 | Lens 3 | -1.41949 (ASP) | 0.493 | Plastic | 1.544 | 55.9 | 4.92 |
| 7 | | -1.04137 (ASP) | 0.057 | | | | |
| 8 | Lens4 | 1.54733 (ASP) | 0.347 | Plastic | 1.544 | 55.9 | -6.31 |
| 9 | | 0.98245 (ASP) | 0.600 | | | | |
| 10 | Lens5 | -27.39420 (ASP) | 0.463 | Plastic | 1.632 | 23.4 | -31.59 |
| 11 | | 74.12050 (ASP) | 0.700 | | | | |
| 12 | IR-filter | Plano | 0.300 | Glass | 1.517 | 64.2 | - |
| 13 | | Plano | 0.854 | | | | |
| 14 | Image | Plano | | | | | |

Fig.13

| TABLE 6 | | | | | |
|---|---|---|---|---|---|
| Aspheric Coefficients | | | | | |
| Surface # | 2 | 3 | 4 | 5 | 6 |
| k = | -7.31488E-01 | -1.00000E+00 | -6.93011E+01 | 1.00000E+01 | -4.81192E+00 |
| A4 = | -4.33067E-03 | -5.52544E-02 | 7.19571E-04 | 7.69228E-02 | -1.09318E-01 |
| A6 = | -3.53836E-02 | -4.23539E-02 | -2.95759E-02 | -1.61888E-03 | 1.45056E-02 |
| A8 = | 2.50236E-02 | 1.64020E-02 | 4.79030E-02 | 1.45137E-03 | 1.38029E-02 |
| A10= | -3.77928E-02 | -1.19947E-02 | -2.23010E-03 | 7.83440E-03 | -7.59344E-03 |
| A12= |  | -7.82094E-04 | -1.10055E-03 | 4.01261E-03 | -4.05183E-03 |
| Surface # | 7 | 8 | 9 | 10 | 11 |
| k = | -2.15474E+00 | -1.25498E+01 | -5.72475E+00 | -1.00000E+00 | -8.74856E+01 |
| A4 = | -4.07892E-02 | -4.83948E-02 | -4.34306E-02 | -1.00624E-02 | -3.56423E-02 |
| A6 = | -4.04022E-04 | 3.58089E-03 | 5.84028E-03 | 2.17273E-04 | 5.56415E-03 |
| A8 = | 3.58488E-03 | 6.19957E-04 | -7.98856E-04 | 2.55401E-04 | -1.66385E-04 |
| A10= | 1.50324E-03 | -6.42718E-05 | 2.84327E-05 | -5.77673E-05 | -3.99533E-05 |
| A12= | -3.07711E-04 | -1.20545E-06 | -5.34470E-07 |  | 3.32964E-08 |
| A14= |  |  |  |  | 1.63207E-07 |

Fig.14

| TABLE 7 | | | | | | |
|---|---|---|---|---|---|---|
| (Embodiment 4) | | | | | | |
| f = 5.80 mm, Fno = 2.45, HFOV = 33.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.300 | | | | |
| 2 | Lens 1 | 2.10958 (ASP) | 0.994 | Plastic | 1.544 | 55.9 | 3.81 |
| 3 | | -100.00000 (ASP) | 0.195 | | | | |
| 4 | Lens 2 | -11.65230 (ASP) | 0.300 | Plastic | 1.632 | 23.4 | -7.11 |
| 5 | | 7.39440 (ASP) | 1.072 | | | | |
| 6 | Lens 3 | -3.21010 (ASP) | 0.583 | Plastic | 1.544 | 55.9 | 4.01 |
| 7 | | -1.38143 (ASP) | 0.280 | | | | |
| 8 | Lens4 | 2.98427 (ASP) | 0.300 | Plastic | 1.544 | 55.9 | -3.86 |
| 9 | | 1.18924 (ASP) | 0.601 | | | | |
| 10 | Lens5 | -100.23910 (ASP) | 0.593 | Plastic | 1.632 | 23.4 | -41.3 |
| 11 | | 35.37620 (ASP) | 0.500 | | | | |
| 12 | IR-filter | Plano | 0.700 | Glass | 1.517 | 64.2 | - |
| 13 | | Plano | 0.360 | | | | |
| 14 | Image | Plano | | | | | |

Fig.15

| TABLE 8 | | | | | |
|---|---|---|---|---|---|
| Aspheric Coefficients | | | | | |
| Surface # | 2 | 3 | 4 | 5 | 6 |
| k = | -1.73596E-01 | -1.00000E+00 | -4.24190E+01 | -2.33297E+00 | -1.11095E+01 |
| A4 = | 2.61395E-03 | -2.61418E-02 | 1.07137E-03 | 4.09559E-02 | -3.79415E-02 |
| A6 = | -1.14534E-02 | -1.05479E-02 | -2.26425E-02 | -5.91110E-03 | 3.01182E-03 |
| A8 = | 9.62116E-03 | -2.12075E-03 | 1.62113E-02 | 5.87344E-03 | 1.96746E-03 |
| A10= | -5.82039E-03 | 7.02650E-04 | -4.18134E-03 | 9.95414E-04 | -6.08712E-04 |
| A12= |  | -1.31832E-06 | 1.55468E-03 | 8.33940E-04 | -3.32230E-04 |
| Surface # | 7 | 8 | 9 | 10 | 11 |
| k = | -3.41196E+00 | -5.35968E+01 | -6.36496E+00 | -1.00000E+00 | -6.54693E+01 |
| A4 = | -2.01326E-02 | -4.24958E-02 | -2.78785E-02 | -8.04980E-04 | -1.75074E-02 |
| A6 = | -9.21571E-05 | 3.31432E-03 | 3.70173E-03 | -1.22871E-03 | 7.97640E-04 |
| A8 = | 1.87139E-03 | 3.34438E-04 | -4.63718E-04 | 1.25259E-04 | 1.19970E-04 |
| A10= | 5.69561E-04 | -3.20777E-05 | 1.79533E-05 | -7.04814E-06 | -1.80276E-05 |
| A12= | -1.77028E-04 | -5.92288E-07 | -2.27728E-07 |  | 5.41637E-07 |

Fig.16

| Table 9 | | | | |
|---|---|---|---|---|
| | Embodiment 1 | Embodiment 2 | Embodiment 3 | Embodiment 4 |
| f | 4.31 | 4.46 | 5.33 | 5.80 |
| Fno | 2.85 | 2.78 | 2.90 | 2.45 |
| HFOV | 33.9 | 33.0 | 33.5 | 33.5 |
| V1-V2 | 32.5 | 32.5 | 32.5 | 32.5 |
| Vp-Vn | 25.7 | 0.0 | 0.0 | 0.0 |
| | | 25.7 | 32.5 | 32.5 |
| f1/f3 | 0.22 | 0.23 | 0.70 | 0.95 |
| |f/f3| | 0.30 | 0.34 | 1.08 | 1.45 |
| f/f4 | 0.07 | -0.05 | -0.84 | -1.50 |
| f/f5 | -0.55 | -0.55 | -0.17 | -0.14 |
| R1/f | 0.41 | 0.39 | 0.37 | 0.36 |
| Y'/Y | 0.68 | 0.67 | 0.66 | 0.66 |
| TTL/ImgH | 1.74 | 1.78 | 1.66 | 1.62 |

Fig.17

IMAGING LENS SYSTEM

BACKGROUND OF THE INVENTION

1. Field of the Invention

The present invention relates to an imaging lens system, and more particularly, to a compact imaging lens system used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device).

Furthermore, as advances in semiconductor manufacturing technology has allowed the pixel size of sensors to be reduced and the resolution of compact imaging lenses has gradually increased, there is an increasing demand for compact imaging lenses featuring better image quality.

A conventional compact lens assembly for mobile phone cameras, such as the four lens element assembly disclosed in U.S. Pat. No. 7,365,920, generally comprises four lens elements. However, the four-element lens has become insufficient for a high-end imaging lens assembly due to the rapid increase in the resolution of mobile phone cameras, the reduction in the pixel size of sensors and the increasing demand for compact lens assemblies featuring better image quality. As there is an ongoing trend toward compact yet powerful electronic products, a need exists in the art for an imaging lens system applicable to high-resolution mobile phone cameras while maintaining a moderate total track length.

SUMMARY OF THE INVENTION

The present invention provides an imaging lens system comprising, in order from an object side to an image side: a first lens element with positive refractive power having a convex object-side surface; a second lens element with negative refractive power; a third lens element with positive refractive power, at least one of the object-side and image-side surfaces thereof being aspheric; a fourth lens element, the image-side surface thereof being aspheric and provided with at least one inflection point; a fifth lens element having a concave object-side surface, at least one of the object-side and image-side surfaces thereof being aspheric; and an aperture stop disposed between an imaged object and the second lens element.

Such an arrangement of optical elements can effectively correct aberrations to improve image quality of the system, and can reduce the total track length of the imaging lens system to keep the system compact.

In the aforementioned imaging lens system, the first lens element provides positive refractive power, and the aperture stop is disposed near the object side of the imaging lens system, and thereby the total track length of the imaging lens system can be reduced effectively. The aforementioned arrangement also enables the exit pupil of the imaging lens system to be positioned far away from the image plane, and thus light will be projected onto the electronic sensor at a nearly perpendicular angle; this is the telecentric feature of the image side. The telecentric feature is very important to the photosensitive power of the current solid-state sensor as it can improve the photosensitivity of the sensor to reduce the probability of the occurrence of shading. Moreover, the image-side surface of the fourth lens element provided with at least one inflection point can effectively reduce the angle at which the light is projected onto the sensor from the off-axis field so that the off-axis aberrations can be further corrected. In addition, when the aperture stop is disposed near the second lens element, a wide field of view can be favorably achieved. Such an aperture stop placement facilitates the correction of the distortion and chromatic aberration of magnification, and thereby the sensitivity of the imaging lens system can be effectively reduced. In other words, when the aperture stop is disposed near the imaged object, the telecentric feature is emphasized and this enables a shorter total track length. When the aperture stop is disposed near the second lens element, the emphasis is on the wide field of view so that the sensitivity of the imaging lens system can be effectively reduced.

The present invention provides another imaging lens system comprising, in order from the object side to the image side: a first lens element with positive refractive power having a convex object-side surface; a second lens element with negative refractive power; a third lens element with positive refractive power; a fourth lens element with positive or negative refractive power, the image-side surface thereof being aspheric and provided with at least one inflection point; and a fifth lens element with positive or negative refractive power having a concave object-side surface, at least one of the object-side and image-side surfaces thereof being aspheric. In this imaging lens system, the focal length of the first lens element is f1, the focal length of the third lens element is f3, and they satisfy the relation: 0<f1/f3<1.2; the curvature radius of the object-side surface of the first lens element is R1, the focal length of the imaging lens system is f, and they satisfy the relation: 0.30<R1/f<0.50; the Abbe number of the first lens element is V1, the Abbe number of the second lens element is V2, and they satisfy the relation: 22.0<V1−V2; and the lens elements with refractive power are limited to the first, second, third, fourth, and fifth lens elements.

The present invention provides yet another imaging lens system comprising, in order from the object side to the image side: a first lens element with positive refractive power having a convex object-side surface; a second lens element with negative refractive power; a third lens element with positive or negative refractive power; a fourth lens element with positive or negative refractive power, the image-side surface thereof being aspheric and provided with at least one inflection point; and a fifth lens element with positive or negative refractive power having a concave object-side surface, at least one of the object-side and image-side surfaces thereof being aspheric. In this imaging lens system, the focal length of the imaging lens system is f, the focal length of the third lens element is f3, and they satisfy the relation: 0.2<|f/f3|; the curvature radius of the object-side surface of the first lens element is R1, the focal length of the imaging lens system is f, and they satisfy the relation: 0.30<R1/f<0.50; the Abbe number of the first lens element is V1, the Abbe number of the second lens element is V2, and they satisfy the relation: 22.0<V1−V2; and the lens elements with refractive power are limited to the first, second, third, fourth, and fifth lens elements.

BRIEF DESCRIPTION OF THE DRAWINGS

FIG. 9 is TABLE 1 which lists the optical data of the first embodiment.

FIG. 10 is TABLE 2 which lists the aspheric surface data of the first embodiment.

FIG. 11 is TABLE 3 which lists the optical data of the second embodiment.

FIG. 12 is TABLE 4 which lists the aspheric surface data of the second embodiment.

FIG. 13 is TABLE 5 which lists the optical data of the third embodiment.

FIG. 14 is TABLE 6 which lists the aspheric surface data of the third embodiment.

FIG. 15 is TABLE 7 which lists the optical data of the fourth embodiment.

FIG. 16 is TABLE 8 which lists the aspheric surface data of the fourth embodiment.

FIG. 17 is TABLE 9 which lists the data of the respective embodiments resulting from the equations.

DETAILED DESCRIPTION OF THE PREFERRED EMBODIMENTS

Figure 1:
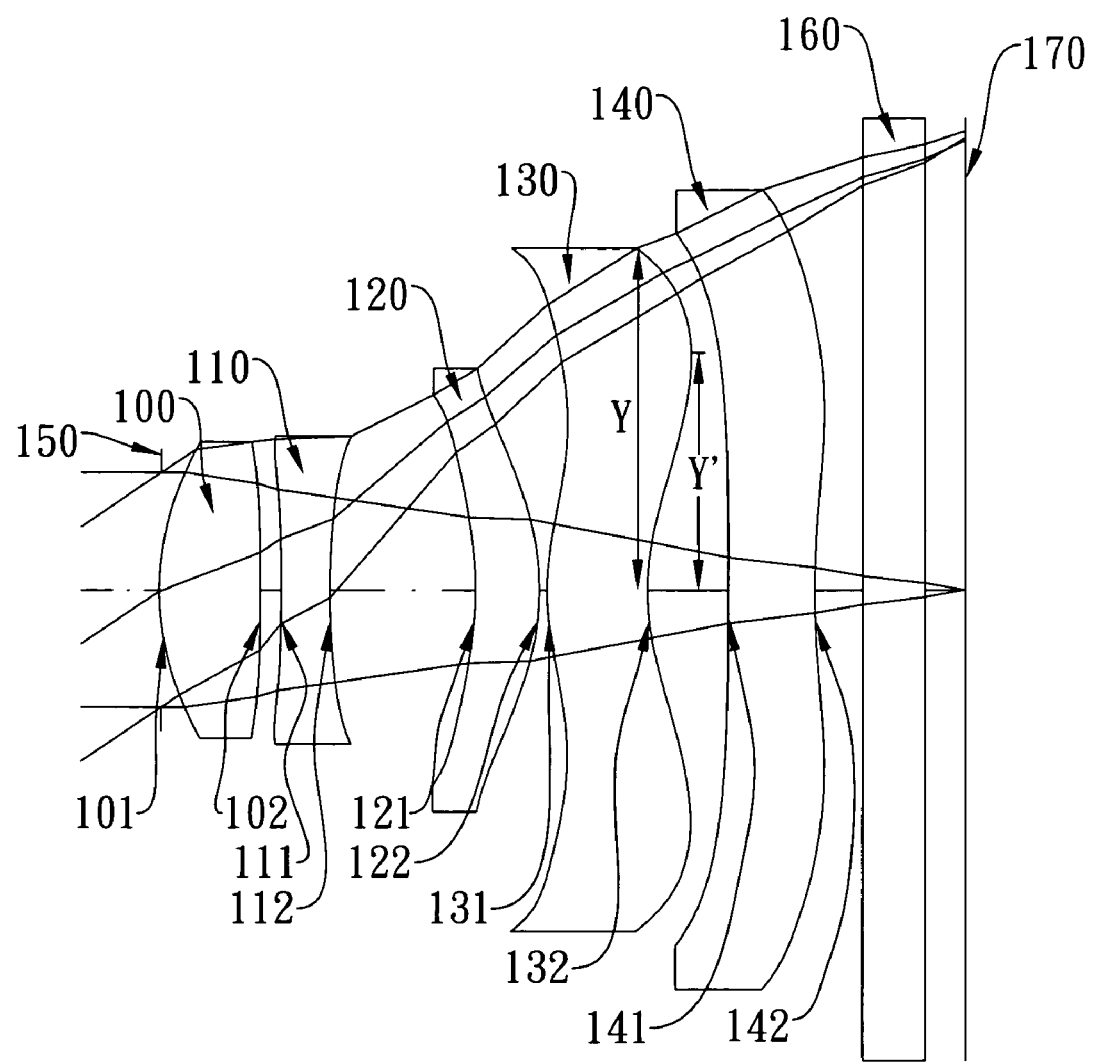
FIG. 1 shows an imaging lens system in accordance with a first embodiment of the present invention.

The present invention provides an imaging lens system including, in order from an object side to an image side: a first lens element with positive refractive power having a convex object-side surface; a second lens element with negative refractive power; a third lens element with positive refractive power, at least one of the object-side and image-side surfaces thereof being aspheric; a fourth lens element, the image-side surface thereof being aspheric and provided with at least one inflection point; a fifth lens element having a concave object-side surface, at least one of the object-side and image-side surfaces thereof being aspheric; and an aperture stop disposed between an imaged object and the second lens element.

In the aforementioned imaging lens system, the first lens element has positive refractive power and a convex object-side surface so that the total track length of the imaging lens system can be effectively reduced. The second lens element has negative refractive power so that the chromatic aberration of the system can be favorably corrected. The third lens element has positive refractive power so that the refractive power of the first lens element can be effectively distributed to reduce the sensitivity of the imaging lens system. The fourth and fifth lens elements may have either positive or negative refractive power. When the fourth and fifth lens elements both have positive refractive power, disposing them behind the second lens element having negative refractive power can effectively reduce the occurrence of astigmatism and distortion, so that the resolution of the imaging lens system can be improved. When the fourth lens element has positive refractive power and the fifth lens element has negative refractive power, a telephoto structure is formed; this facilitates reducing the back focal length as well as the total track length of the imaging lens system. When the fourth lens element has negative refractive power and the fifth lens element has positive refractive power, the aberrations can be favorably corrected, and such an arrangement prevents other kinds of aberrations from becoming too large. When the fourth and fifth lens elements both have negative refractive power, the principal point of the system can be positioned far away from the image plane, thereby effectively reducing the total track length of the imaging lens system.

In the aforementioned imaging lens system, it is preferable that the fourth lens element has a convex object-side surface and a concave image-side surface so that the astigmatism of the system can be favorably corrected.

In the aforementioned imaging lens system, it is preferable that the second lens element has concave object-side and image-side surfaces so that the Petzval Sum of the system can be effectively corrected and the back focal length of the system can be lengthened. It is also preferable that the third lens element has a concave object-side surface and a convex image-side surface so that the astigmatism of the system can be favorably corrected.

In the aforementioned imaging lens system, when the fifth lens element has a concave object-side surface and a convex image-side surface, this helps to ensure that there is sufficient space behind the lens system for accommodating other components. When the fifth lens element has concave object-side and image-side surfaces, the Petzval Sum of the system can be effectively corrected, enabling the focal plane to become more flat near the periphery.

In the aforementioned imaging lens system, the focal length of the first lens element is f1, the focal length of the third lens element is f3, and they preferably satisfy the relation: $0<f1/f3<1.2$. When the above relation is satisfied, the refractive power of the system is mainly provided by the first lens element and thereby the total track length of the system can be effectively reduced. And it will be more preferable that f1 and f3 satisfy the relation: $0.55<f1/f3<1.0$.

In the aforementioned imaging lens system, the focal length of the imaging lens system is f, the focal length of the fourth lens element is f4, and they preferably satisfy the relation: $-1.9<f/f4<0.4$. When the above relation is satisfied, the high order aberrations of the system can be favorably corrected. And it will be more preferable that f and f4 satisfy the relation: $-1.7<f/f4<-0.5$.

In the aforementioned imaging lens system, the Abbe number of the first lens element is V1, the Abbe number of the second lens element is V2, and they preferably satisfy the relation: $28.5<V1-V2<45.2$. When the above relation is satisfied, the chromatic aberration can be effectively corrected.

In the aforementioned imaging lens system, it is preferable that at least one of the third, fourth, and fifth lens elements has positive refractive power with the Abbe number Vp, that at least one of them has negative refractive power with the Abbe number Vn, and that Vp and Vn satisfy the relation: $22.0<Vp-Vn$. When the above relation is satisfied, the chromatic aberration of the system can be corrected more effectively.

In the aforementioned imaging lens system, the curvature radius of the object-side surface of the first lens element is R1, the focal length of the imaging lens system is f, and they preferably satisfy the relation: $0.30<R1/f<0.50$. When the above relation is satisfied, the total track length of the imaging lens system can be effectively reduced, and the high order aberrations can be prevented from becoming too large.

In the aforementioned imaging lens system, there is a point on the image-side surface of the fourth lens element with a tangent plane perpendicular to the optical axis; the distance between the point and the optical axis is Y'; and the clear aperture radius of the image-side surface of the fourth lens element is Y. The clear aperture radius is the distance between the optical axis and the farthest point of the effective area of the lens surface that allows incoming light to pass through the lens element. It is preferable that Y' and Y satisfy the relation:

0.55<Y'/Y<1.0. When the above relation is satisfied, the off-axis aberrations of the system can be favorably corrected.

In the aforementioned imaging lens system, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens system can be reduced effectively. Preferably, at least three of the lens elements are made of plastic, and their object-side and image-side surfaces are aspheric.

In the aforementioned imaging lens system, it is preferable that the aperture stop is disposed between the imaged object and the first lens element so that the telecentric feature is emphasized, resulting in a shorter total track length.

The aforementioned imaging lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<1.95. When the above relation is satisfied, the imaging lens system can more easily maintain a compact form, enabling it for it to be equipped in compact portable electronic products.

In the aforementioned imaging lens system, the focal length of the imaging lens system is f, the focal length of the fifth lens element is f5, and they preferably satisfy the relation: −0.58<f/f5<0.30. When the above relation is satisfied, the fifth lens element functions as a correction lens that can balance and correct the aberrations of the system to improve image quality.

According to another aspect of the present invention, an imaging lens system comprises, in order from the object side to the image side: a first lens element with positive refractive power having a convex object-side surface; a second lens element with negative refractive power; a third lens element with positive refractive power; a fourth lens element with positive or negative refractive power, the image-side surface thereof being aspheric and provided with at least one inflection point; and a fifth lens element with positive or negative refractive power having a concave object-side surface, at least one of the object-side and image-side surfaces thereof being aspheric. In this imaging lens system, the focal length of the first lens element is f1, the focal length of the third lens element is f3, and they satisfy the relation: 0<f1/f3<1.2; the curvature radius of the object-side surface of the first lens element is R1, the focal length of the imaging lens system is f, and they satisfy the relation: 0.30<R1/f<0.50; the Abbe number of the first lens element is V1, the Abbe number of the second lens element is V2, and they satisfy the relation: 22.0<V1−V2; and the lens elements with refractive power are limited to the first, second, third, fourth, and fifth lens elements.

In the aforementioned imaging lens system, when the relation 0<f1/f3<1.2 relation is satisfied, the refractive power of the system is mainly provided by the first lens element and thereby the total track length of the system can be effectively reduced. When the relation 0.30<R1/f<0.50 is satisfied, the total track length of the imaging lens system can be effectively reduced, and the high order aberrations can be prevented from becoming too large. When the relation 22.0<V1−V2 is satisfied, the chromatic aberration of the system can be effectively corrected.

According to another aspect of the present invention, an imaging lens system comprises, in order from the object side to the image side: a first lens element with positive refractive power having a convex object-side surface; a second lens element with negative refractive power; a third lens element with positive or negative refractive power; a fourth lens element with positive or negative refractive power, the image-side surface thereof being aspheric and provided with at least one inflection point; and a fifth lens element with positive or negative refractive power having a concave object-side surface, at least one of the object-side and image-side surfaces thereof being aspheric. In this imaging lens system, the focal length of the imaging lens system is f, the focal length of the third lens element is f3, and they satisfy the relation: 0.2<|f/f3|; the curvature radius of the object-side surface of the first lens element is R1, the focal length of the imaging lens system is f, and they satisfy the relation: 0.30<R1/f<0.50; the Abbe number of the first lens element is V1, the Abbe number of the second lens element is V2, and they satisfy the relation: 22.0<V1−V2; and the lens elements with refractive power are limited to the first, second, third, fourth, and fifth lens elements.

In the aforementioned imaging lens system, when the relation 0.2<|f/f3| is satisfied, the refractive power that the system requires can be effectively distributed; the sensitivity of the system can thus be reduced, thereby reducing manufacturing variability of the imaging lens system. When the relation 0.30<R1/f<0.50 is satisfied, the total track length of the imaging lens system can be effectively reduced, and the high order aberrations can be prevented from becoming too large. When the relation 22.0<V1−V2 is satisfied, the chromatic aberration of the system can be effectively corrected.

In an imaging lens system of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens system can be reduced effectively.

In an imaging lens system of the present invention, if a lens element has a convex surface, it means the portion of the surface near the axis is convex; if a lens element has a concave surface, it means the portion of the surface near the axis is concave.

Preferred embodiments of the present invention will be described in the following paragraphs by referring to the accompanying drawings.

Figure 2:
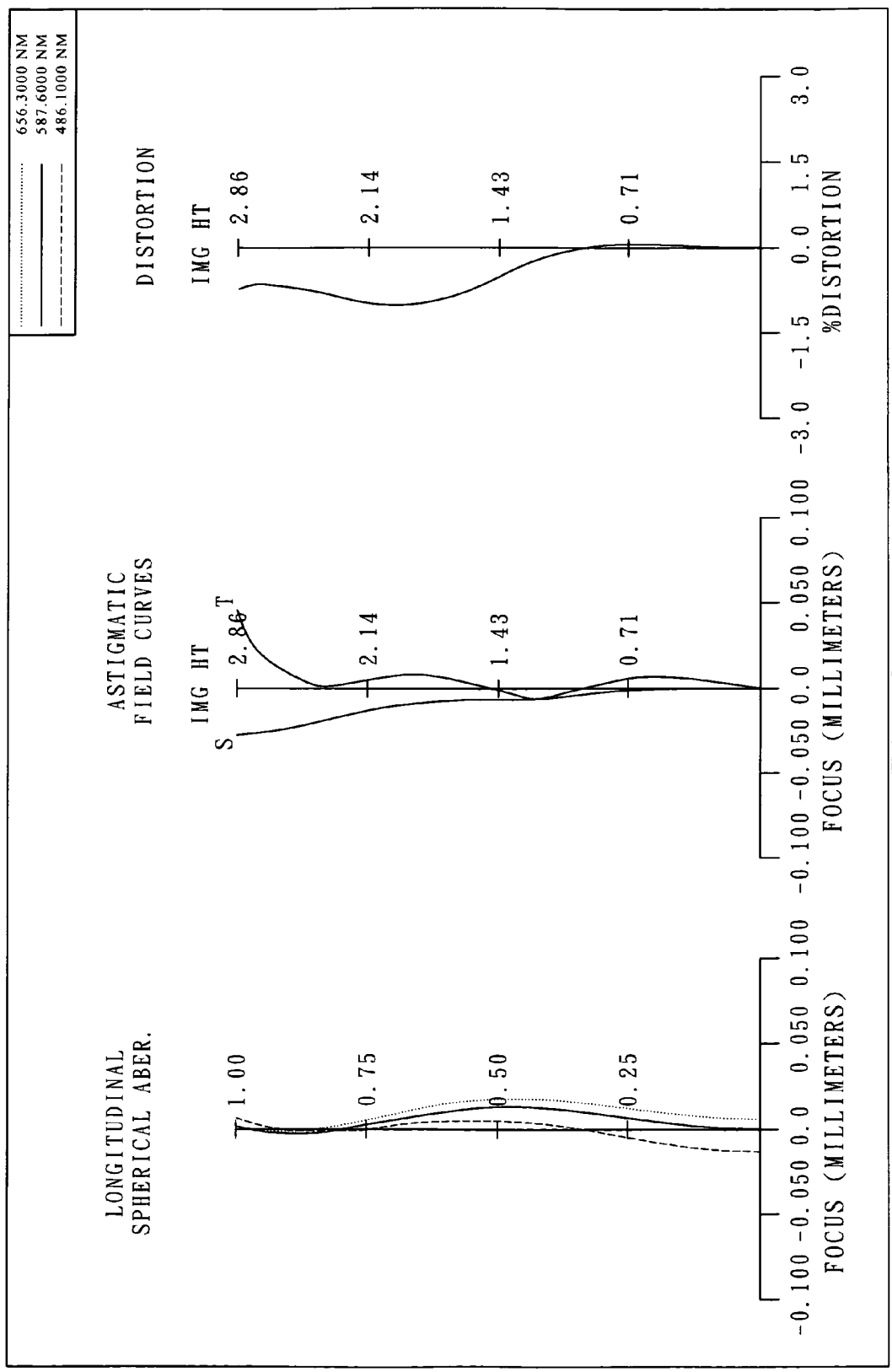
FIG. 2 shows the aberration curves of the first embodiment of the present invention.

FIG. 1 shows an imaging lens system in accordance with a first embodiment of the present invention, and FIG. 2 shows the aberration curves of the first embodiment of the present invention. The imaging lens system of the first embodiment of the present invention mainly comprises five lens elements, in order from the object side to the image side: a plastic first lens element 100 with positive refractive power having convex object-side and image-side surfaces 101 and 102, the object-side and image-side surfaces 101 and 102 both being aspheric; a plastic second lens element 110 with negative refractive power having concave object-side and image-side surfaces 111 and 112, the object-side and image-side surfaces 111 and 112 both being aspheric; a plastic third lens element 120 with positive refractive power having a concave object-side surface 121 and a convex image-side surface 122, the object-side and image-side surfaces 121 and 122 both being aspheric; a plastic fourth lens element 130 with positive refractive power having a convex object-side surface 131 and a concave image-side surface 132, the object-side and image-side surfaces 131 and 132 both being aspheric and provided with at least one inflection point; and a plastic fifth lens element 140 with negative refractive power having concave object-side and image-side surfaces 141 and 142, the object-side and image-side surfaces 141 and 142 both being aspheric; and an aperture stop 150 disposed between an imaged object and the first lens element 100. The imaging lens system further comprises an IR filter 160 disposed between the image-side surface 142 of the fifth lens element 140 and the image plane 170; the IR filter 160 has no influence on the focal length of the imaging lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens system, the focal length of the imaging lens system is f, and it satisfies the relation: f=4.31.

In the first embodiment of the present imaging lens system, the f-number of the imaging lens system is Fno, and it satisfies the relation: Fno=2.85.

In the first embodiment of the present imaging lens system, half of the maximal field of view of the imaging lens system is HFOV, and it satisfies the relation: HFOV=33.9 degrees.

In the first embodiment of the present imaging lens system, the focal length of the first lens element 100 is f1, the focal length of the third lens element 120 is f3, and they satisfy the relation: f1/f3=0.22.

In the first embodiment of the present imaging lens system, the focal length of the system is f, the focal length of the fourth lens element 130 is f4, and they satisfy the relation: f/f4=0.07.

In the first embodiment of the present imaging lens system, the Abbe number of the first lens element 100 is V1, the Abbe number of the second lens element 110 is V2, and they satisfy the relation: V1−V2=32.5.

In the first embodiment of the present imaging lens system, the third lens element 120 has positive refractive power and its Abbe number Vp satisfies the relation: Vp=55.9; the fourth lens element 130 has positive refractive power and its Abbe number Vp satisfies the relation: Vp=55.9; the fifth lens element 140 has negative refractive power and its Abbe number Vn satisfies the relation: Vn=30.2. Vp and Vn satisfy the relations:

Vp−Vn=25.7 (the third lens element 120 and the fifth lens element 140);

Vp−Vn=25.7 (the fourth lens element 130 and the fifth lens element 140).

In the first embodiment of the present imaging lens system, the curvature radius of the object-side surface 101 of the first lens element 100 is R1, the focal length of the imaging lens system is f, and they satisfy the relation: R1/f=0.41.

In the first embodiment of the present imaging lens system, on the image-side surface 132 of the fourth lens element 130, there is a point which has a tangent plane perpendicular to the optical axis; the distance between the point and the optical axis is Y' (referring to FIG. 1); the clear aperture radius of the image-side surface 132 of the fourth lens element is Y (referring to FIG. 1); and Y' and Y satisfy the relation: Y'/Y=0.68.

In the first embodiment of the present imaging lens system, the image plane 170 is provided with an electronic sensor on which an object is imaged. The on-axis spacing between the object-side surface 101 of the first lens element 100 and the electronic sensor is TTL, half of the diagonal length of the effective pixel area of the electronic sensor is ImgH, and they satisfy the relation: TTL/ImgH=1.74.

In the first embodiment of the present imaging lens system, the focal length of the fifth lens element 140 is f5, the focal length of the system is f, and they satisfy the relation: f/f5=−0.55.

In the first embodiment of the present imaging lens system, the focal length of the system is f, the focal length of the third lens element 120 is f3, and they satisfy the relation: |f/f3|=0.30.

The detailed optical data of the first embodiment is shown in FIG. 9 (TABLE 1), and the aspheric surface data is shown in FIG. 10 (TABLE 2), wherein the units of the curvature radius, the thickness and the focal length are expressed in mm, and HFOV is half of the maximal field of view.

Figure 3:
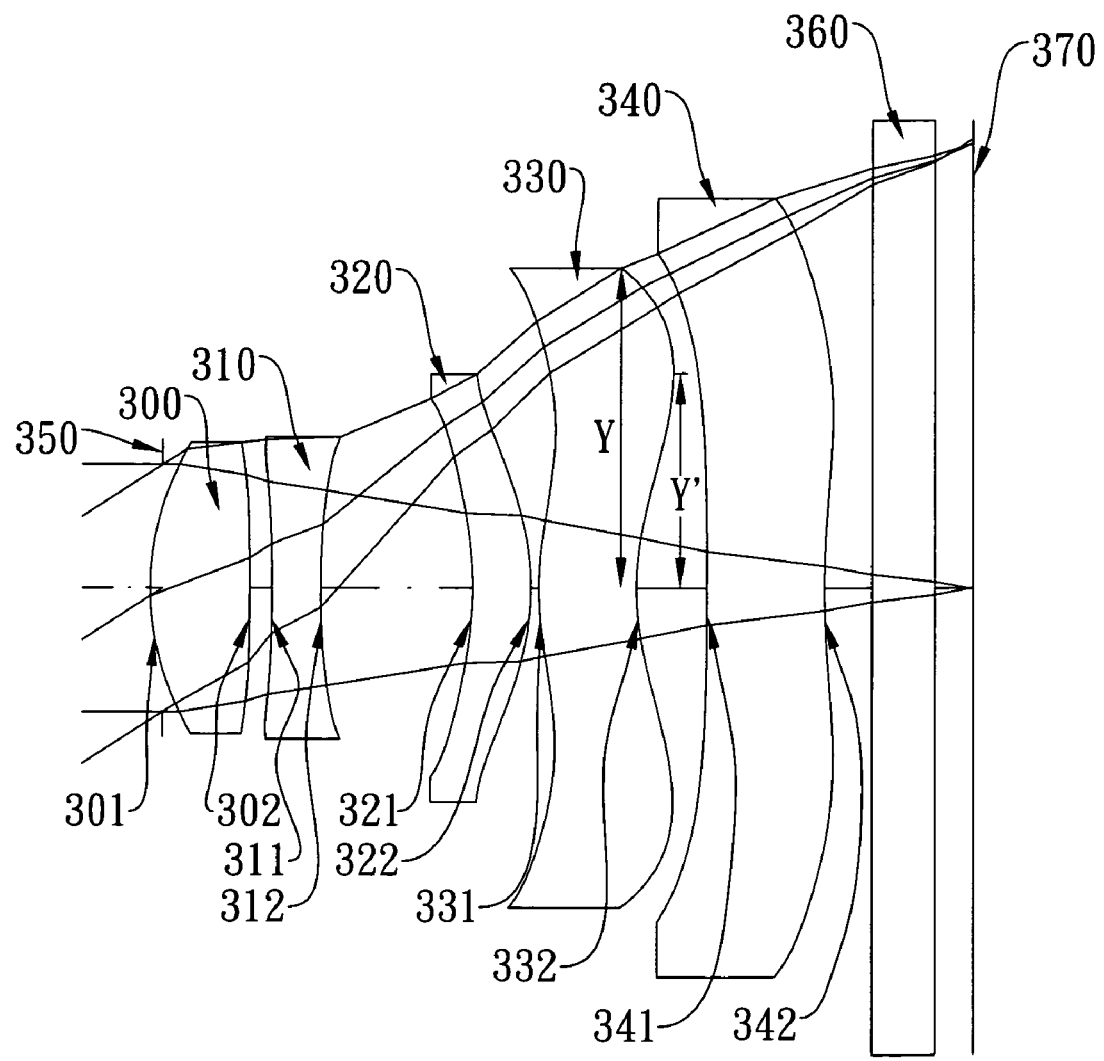
FIG. 3 shows an imaging lens system in accordance with a second embodiment of the present invention.
Figure 4:
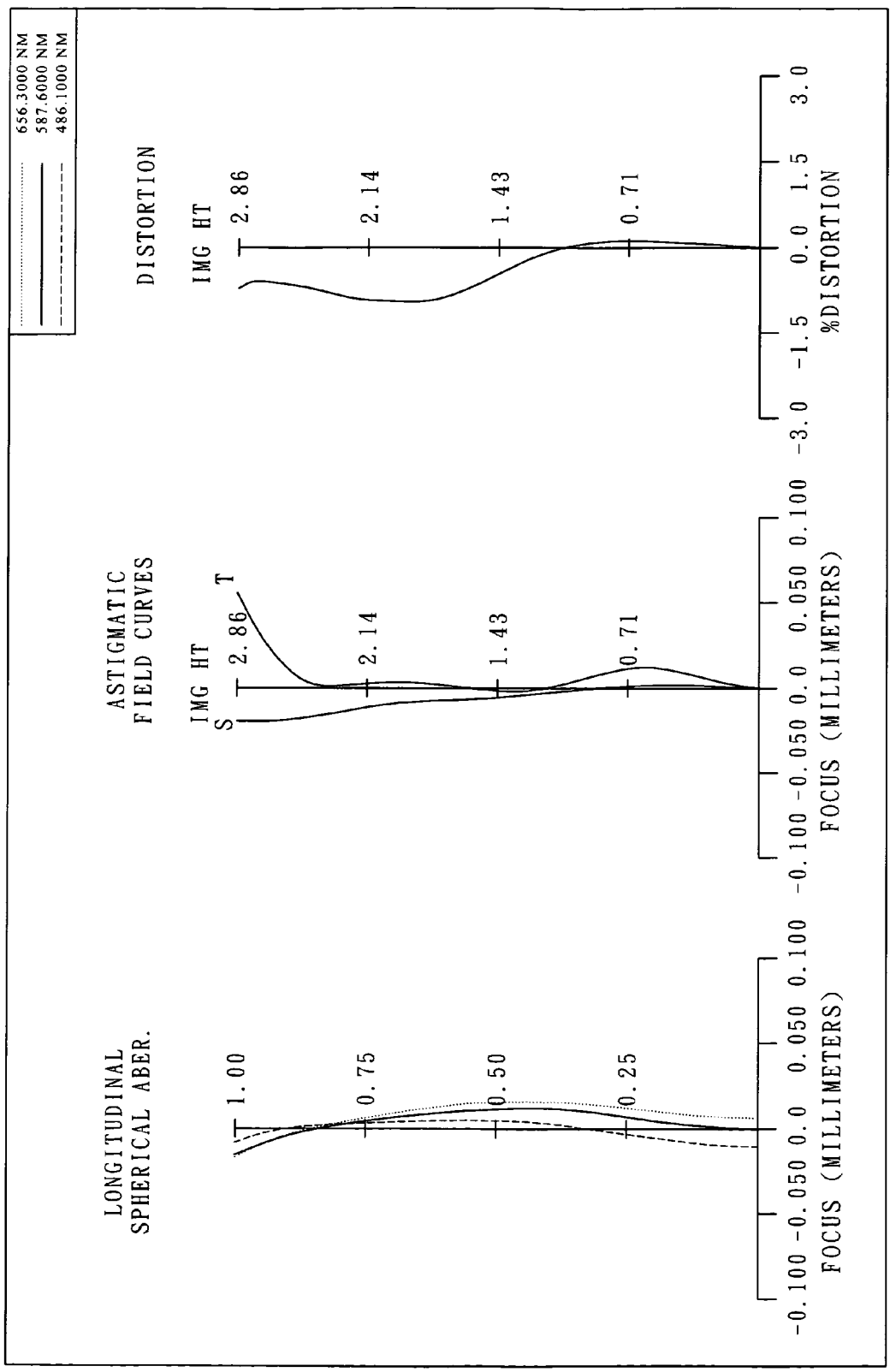
FIG. 4 shows the aberration curves of the second embodiment of the present invention.

FIG. 3 shows an imaging lens system in accordance with a second embodiment of the present invention, and FIG. 4 shows the aberration curves of the second embodiment of the present invention. The imaging lens system of the second embodiment of the present invention mainly comprises five lens elements, in order from the object side to the image side: a plastic first lens element 300 with positive refractive power having convex object-side and image-side surfaces 301 and 302, the object-side and image-side surfaces 301 and 302 both being aspheric; a plastic second lens element 310 with negative refractive power having concave object-side and image-side surfaces 311 and 312, the object-side and image-side surfaces 311 and 312 both being aspheric; a plastic third lens element 320 with positive refractive power having a concave object-side surface 321 and a convex image-side surface 322, the object-side and image-side surfaces 321 and 322 both being aspheric; a plastic fourth lens element 330 with negative refractive power having a convex object-side surface 331 and a concave image-side surface 332, the object-side and image-side surfaces 331 and 332 both being aspheric and provided with at least one inflection point; and a plastic fifth lens element 340 with negative refractive power having concave object-side and image-side surfaces 341 and 342, the object-side and image-side surfaces 341 and 342 both being aspheric; and an aperture stop 350 disposed between an imaged object and the first lens element 300. The imaging lens system further comprises an IR filter 360 disposed between the image-side surface 342 of the fifth lens element 340 and the image plane 370; the IR filter 360 has no influence on the focal length of the imaging lens system.

The equation of the aspheric surface profiles of the second embodiment has the same form as that of the first embodiment.

In the second embodiment of the present imaging lens system, the focal length of the imaging lens system is f, and it satisfies the relation: f=4.46.

In the second embodiment of the present imaging lens system, the f-number of the imaging lens system is Fno, and it satisfies the relation: Fno=2.78.

In the second embodiment of the present imaging lens system, half of the maximal field of view of the imaging lens system is HFOV, and it satisfies the relation: HFOV=33.0 degrees.

In the second embodiment of the present imaging lens system, the focal length of the first lens element 300 is f1, the focal length of the third lens element 320 is f3, and they satisfy the relation: f1/f3=0.23.

In the second embodiment of the present imaging lens system, the focal length of the system is f, the focal length of the fourth lens element 330 is f4, and they satisfy the relation: f/f4=−0.05.

In the second embodiment of the present imaging lens system, the Abbe number of the first lens element 300 is V1, the Abbe number of the second lens element 310 is V2, and they satisfy the relation: V1−V2=32.5.

In the second embodiment of the present imaging lens system, the third lens element 320 has positive refractive power and its Abbe number Vp satisfies the relation: Vp=55.9; the fourth lens element 330 has negative refractive power and its Abbe number Vn satisfies the relation: Vn=55.9; the fifth lens element 340 has negative refractive power and its Abbe number Vn satisfies the relation: Vn=30.2. Vp and Vn satisfy the relations:

Vp−Vn=0.0 (the third lens element 320 and the fourth lens element 330);

Vp−Vn=25.7 (the third lens element 320 and the fifth lens element 340).

In the second embodiment of the present imaging lens system, the curvature radius of the object-side surface 301 of the first lens element 300 is R1, the focal length of the imaging lens system is f, and they satisfy the relation: R1/f=0.39.

In the second embodiment of the present imaging lens system, on the image-side surface 332 of the fourth lens element 330, there is a point which has a tangent plane perpendicular to the optical axis; the distance between the point and the optical axis is Y' (referring to FIG. 3); the clear aperture radius of the image-side surface 332 of the fourth lens element is Y (referring to FIG. 3); and Y' and Y satisfy the relation: Y'/Y=0.67.

In the second embodiment of the present imaging lens system, the image plane 370 is provided with an electronic sensor on which an object is imaged. The on-axis spacing between the object-side surface 301 of the first lens element 300 and the electronic sensor is TTL, half of the diagonal length of the effective pixel area of the electronic sensor is ImgH, and they satisfy the relation: TTL/ImgH=1.78.

In the second embodiment of the present imaging lens system, the focal length of the fifth lens element 340 is f5, the focal length of the system is f, and they satisfy the relation: f/f5=−0.55.

In the second embodiment of the present imaging lens system, the focal length of the system is f, the focal length of the third lens element 320 is f3, and they satisfy the relation: |f/f3|=0.34.

The detailed optical data of the second embodiment is shown in FIG. 11 (TABLE 3), and the aspheric surface data is shown in FIG. 12 (TABLE 4), wherein the units of the curvature radius, the thickness and the focal length are expressed in mm, and HFOV is half of the maximal field of view.

Figure 5:
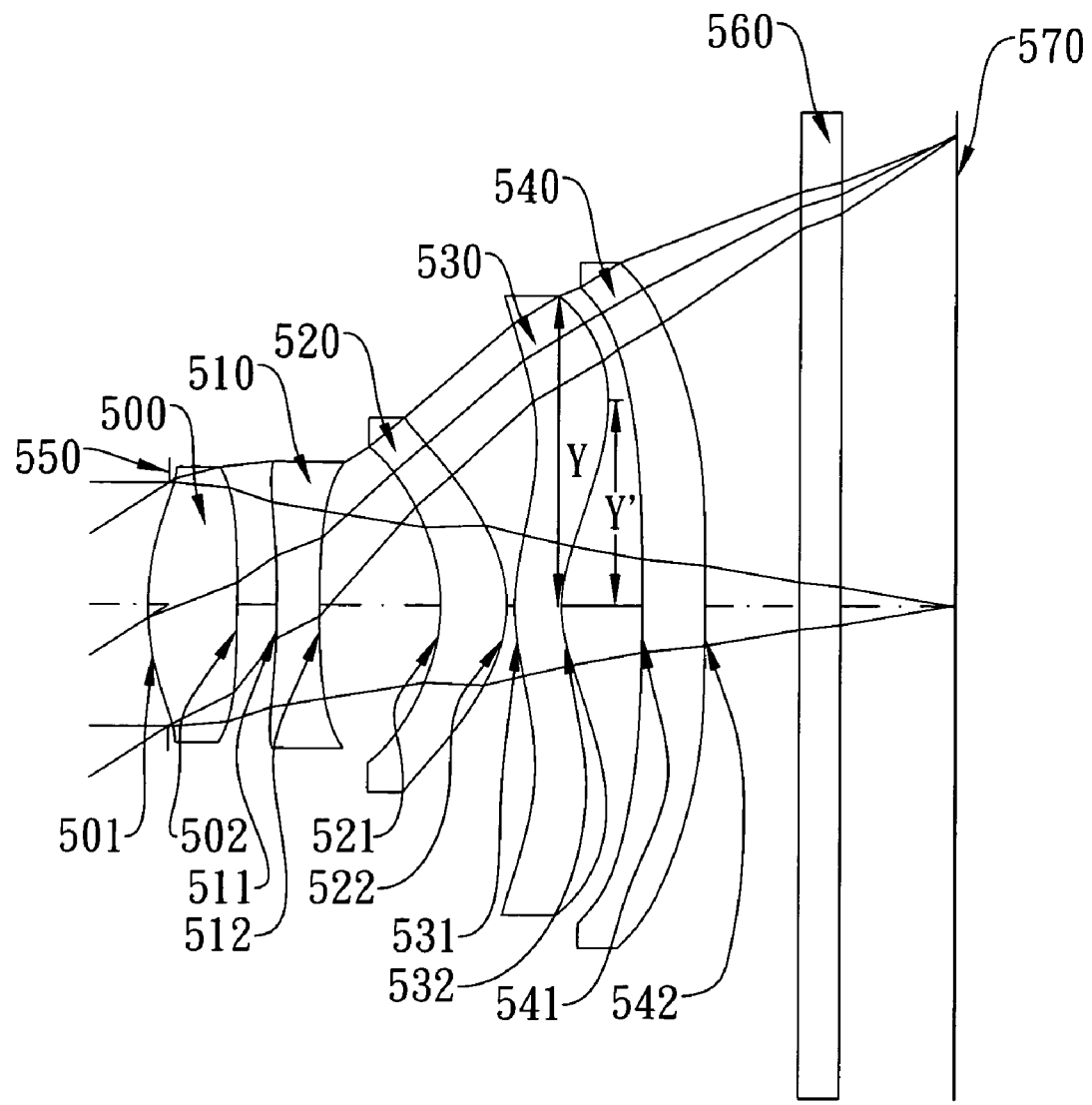
FIG. 5 shows an imaging lens system in accordance with a third embodiment of the present invention.
Figure 6:
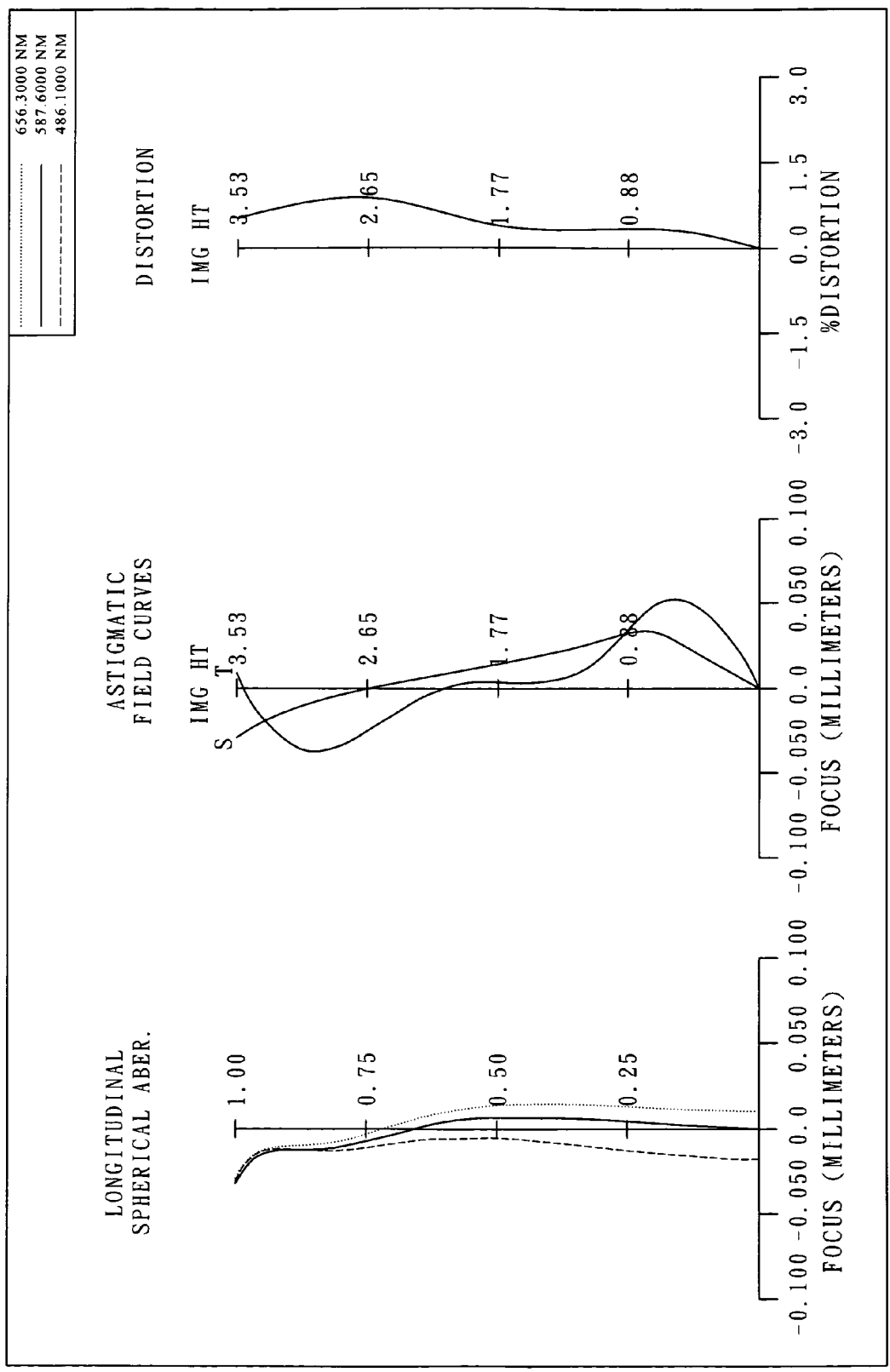
FIG. 6 shows the aberration curves of the third embodiment of the present invention.

FIG. 5 shows an imaging lens system in accordance with a third embodiment of the present invention, and FIG. 6 shows the aberration curves of the third embodiment of the present invention. The imaging lens system of the third embodiment of the present invention mainly comprises five lens elements, in order from the object side to the image side: a plastic first lens element 500 with positive refractive power having convex object-side and image-side surfaces 501 and 502, the object-side and image-side surfaces 501 and 502 both being aspheric; a plastic second lens element 510 with negative refractive power having concave object-side and image-side surfaces 511 and 512, the object-side and image-side surfaces 511 and 512 both being aspheric; a plastic third lens element 520 with positive refractive power having a concave object-side surface 521 and a convex image-side surface 522, the object-side and image-side surfaces 521 and 522 both being aspheric; a plastic fourth lens element 530 with negative refractive power having a convex object-side surface 531 and a concave image-side surface 532, the object-side and image-side surfaces 531 and 532 both being aspheric and provided with at least one inflection point; and a plastic fifth lens element 540 with negative refractive power having concave object-side and image-side surfaces 541 and 542, the object-side and image-side surfaces 541 and 542 both being aspheric; and an aperture stop 550 disposed between an imaged object and the first lens element 500. The imaging lens system further comprises an IR filter 560 disposed between the image-side surface 542 of the fifth lens element 540 and the image plane 570; the IR filter 560 has no influence on the focal length of the imaging lens system.

The equation of the aspheric surface profiles of the third embodiment has the same form as that of the first embodiment.

In the third embodiment of the present imaging lens system, the focal length of the imaging lens system is f, and it satisfies the relation: f=5.33.

In the third embodiment of the present imaging lens system, the f-number of the imaging lens system is Fno, and it satisfies the relation: Fno=2.90.

In the third embodiment of the present imaging lens system, half of the maximal field of view of the imaging lens system is HFOV, and it satisfies the relation: HFOV=33.5 degrees.

In the third embodiment of the present imaging lens system, the focal length of the first lens element 500 is f1, the focal length of the third lens element 520 is f3, and they satisfy the relation: f1/f3=0.70.

In the third embodiment of the present imaging lens system, the focal length of the system is f, the focal length of the fourth lens element 530 is f4, and they satisfy the relation: f/f4=−0.84.

In the third embodiment of the present imaging lens system, the Abbe number of the first lens element 500 is V1, the Abbe number of the second lens element 510 is V2, and they satisfy the relation: V1−V2=32.5.

In the third embodiment of the present imaging lens system, the third lens element 520 has positive refractive power and its Abbe number Vp satisfies the relation: Vp=55.9; the fourth lens element 530 has negative refractive power and its Abbe number Vn satisfies the relation: Vn=55.9; the fifth lens element 540 has negative refractive power and its Abbe number Vn satisfies the relation: Vn=23.4. Vp and Vn satisfy the relations:

Vp−Vn=0.0 (the third lens element 520 and the fourth lens element 530);

Vp−Vn=32.5 (the third lens element 520 and the fifth lens element 540).

In the third embodiment of the present imaging lens system, the curvature radius of the object-side surface 501 of the first lens element 500 is R1, the focal length of the imaging lens system is f, and they satisfy the relation: R1/f=0.37.

In the third embodiment of the present imaging lens system, on the image-side surface 532 of the fourth lens element 530, there is a point which has a tangent plane perpendicular to the optical axis; the distance between the point and the optical axis is Y' (referring to FIG. 5); the clear aperture radius of the image-side surface 532 of the fourth lens element 530 is Y (referring to FIG. 5); and Y' and Y satisfy the relation: Y'/Y=0.66.

In the third embodiment of the present imaging lens system, the image plane 570 is provided with an electronic sensor on which an object is imaged. The on-axis spacing between the object-side surface 501 of the first lens element 500 and the electronic sensor is TTL, half of the diagonal length of the effective pixel area of the electronic sensor is ImgH, and they satisfy the relation: TTL/ImgH=1.66.

In the third embodiment of the present imaging lens system, the focal length of the fifth lens element 540 is f5, the focal length of the system is f, and they satisfy the relation: f/f5=−0.17.

In the third embodiment of the present imaging lens system, the focal length of the system is f, the focal length of the third lens element 520 is f3, and they satisfy the relation: |f/f3|=1.08.

The detailed optical data of the third embodiment is shown in FIG. 13 (TABLE 5), and the aspheric surface data is shown in FIG. 14 (TABLE 6), wherein the units of the curvature radius, the thickness and the focal length are expressed in mm, and HFOV is half of the maximal field of view.

Figure 7:
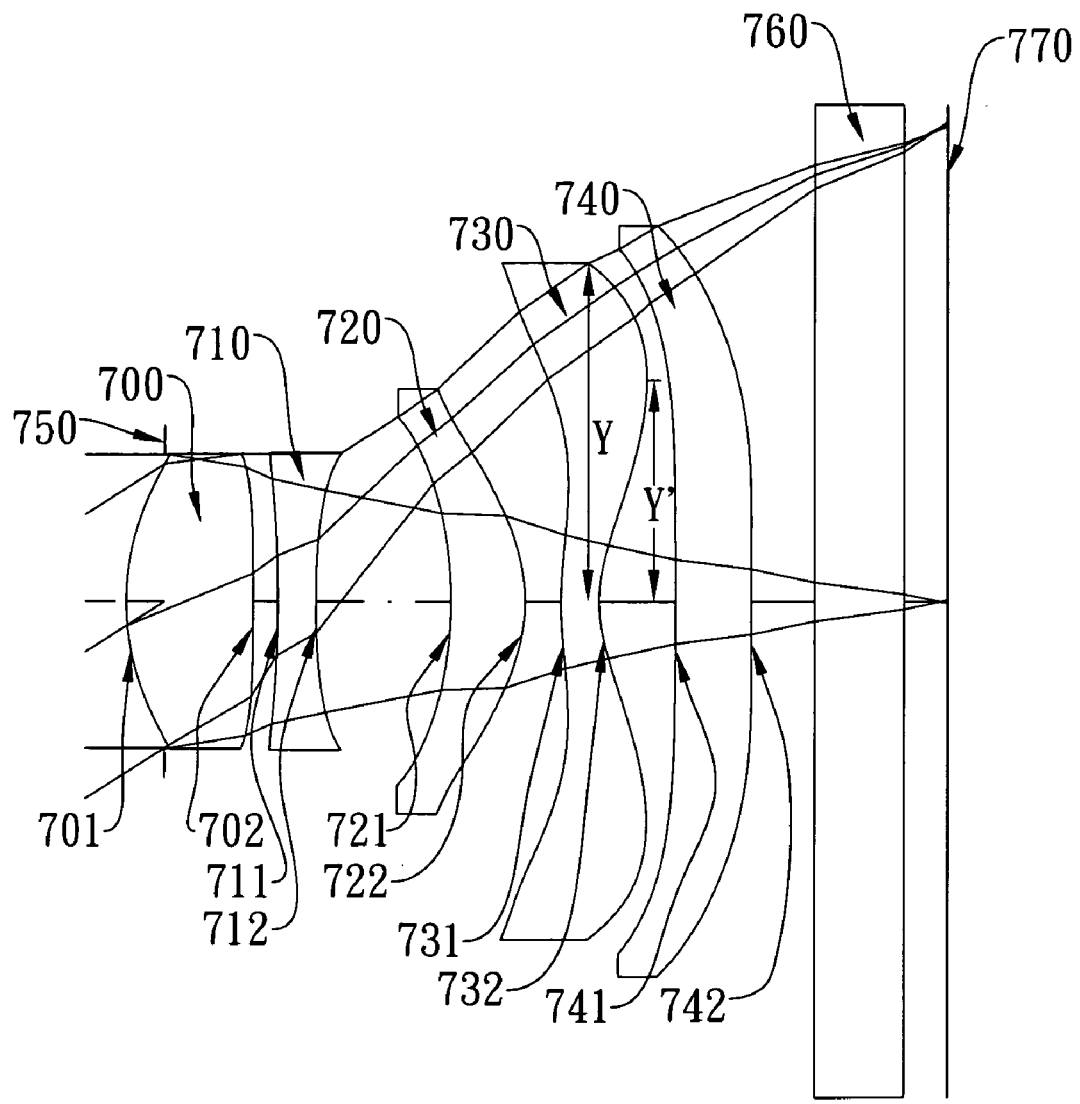
FIG. 7 shows an imaging lens system in accordance with a fourth embodiment of the present invention.
Figure 8:
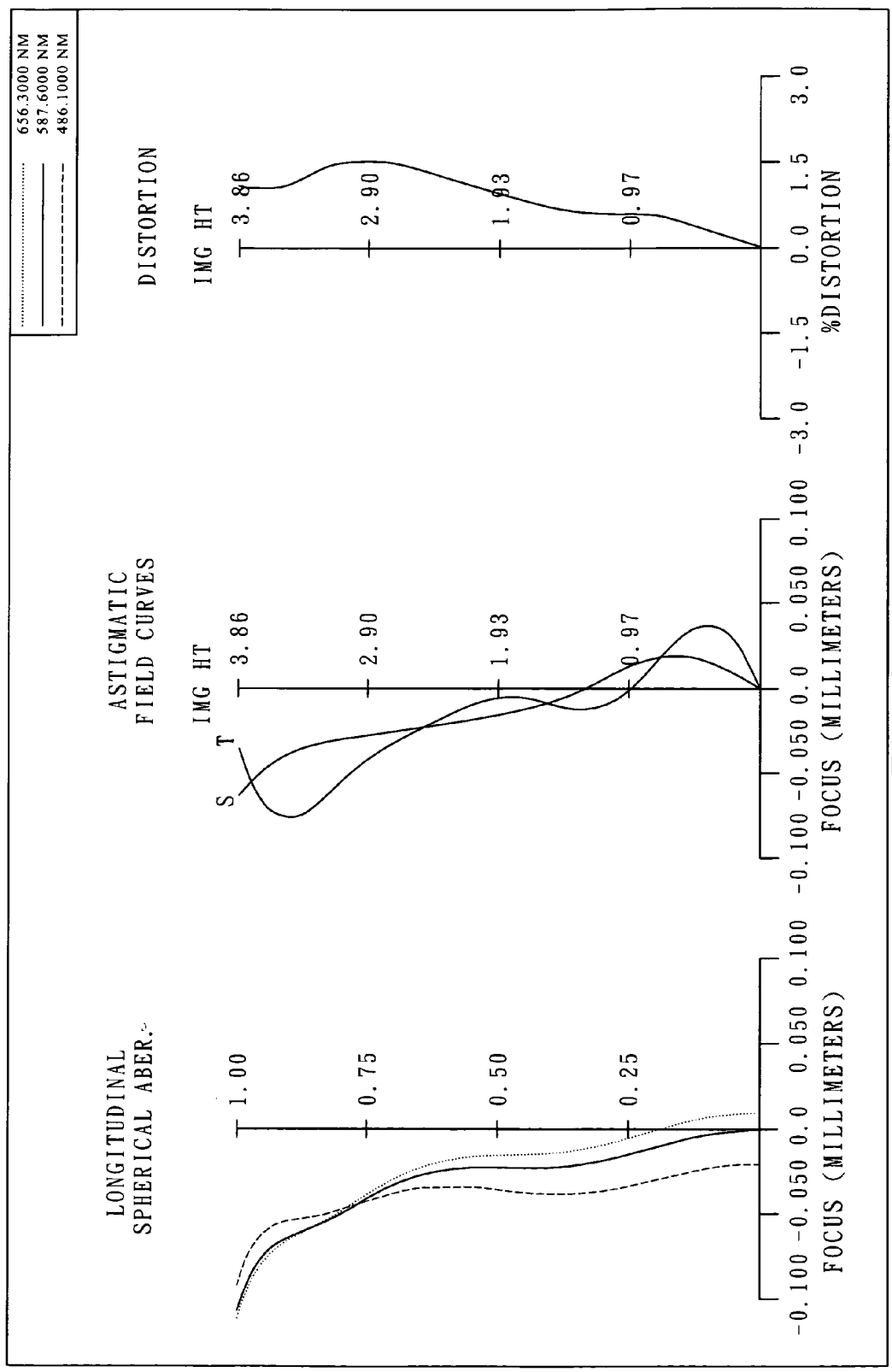
FIG. 8 shows the aberration curves of the fourth embodiment of the present invention.

FIG. 7 shows an imaging lens system in accordance with a fourth embodiment of the present invention, and FIG. 8 shows the aberration curves of the fourth embodiment of the present invention. The imaging lens system of the fourth embodiment of the present invention mainly comprises five lens elements, in order from the object side to the image side: a plastic first lens element 700 with positive refractive power having convex object-side and image-side surfaces 701 and 702, the object-side and image-side surfaces 701 and 702 both being aspheric; a plastic second lens element 710 with negative refractive power having concave object-side and image-side surfaces 711 and 712, the object-side and image-side surfaces 711 and 712 both being aspheric; a plastic third lens element 720 with positive refractive power having a concave object-side surface 721 and a convex image-side surface 722, the object-side and image-side surfaces 721 and 722 both being aspheric; a plastic fourth lens element 730 with negative refractive power having a convex object-side surface 731 and a concave image-side surface 732, the object-side and image-side surfaces 731 and 732 both being aspheric and provided with at least one inflection point; and a plastic fifth lens element 740 with negative refractive power having concave object-side and image-side surfaces 741 and 742, the object-side and image-side surfaces 741 and 742 both being aspheric; and an aperture stop 750 disposed between an imaged object and the first lens element 700. The imaging lens system further comprises an IR filter 760 disposed between the image-side surface 742 of the fifth lens element 740 and the image plane 770; the IR filter 760 has no influence on the focal length of the imaging lens system.

The equation of the aspheric surface profiles of the fourth embodiment has the same form as that of the first embodiment.

In the fourth embodiment of the present imaging lens system, the focal length of the imaging lens system is f, and it satisfies the relation: f=5.80.

In the fourth embodiment of the present imaging lens system, the f-number of the imaging lens system is Fno, and it satisfies the relation: Fno=2.45.

In the fourth embodiment of the present imaging lens system, half of the maximal field of view of the imaging lens system is HFOV, and it satisfies the relation: HFOV=33.5 degrees.

In the fourth embodiment of the present imaging lens system, the focal length of the first lens element 700 is f1, the focal length of the third lens element 720 is f3, and they satisfy the relation: f1/f3=0.95.

In the fourth embodiment of the present imaging lens system, the focal length of the system is f, the focal length of the fourth lens element 730 is f4, and they satisfy the relation: f/f4=−1.50.

In the fourth embodiment of the present imaging lens system, the Abbe number of the first lens element 700 is V1, the Abbe number of the second lens element 710 is V2, and they satisfy the relation: V1−V2=32.5.

In the fourth embodiment of the present imaging lens system, the third lens element 720 has positive refractive power and its Abbe number Vp satisfies the relation: Vp=55.9; the fourth lens element 730 has negative refractive power and its Abbe number Vn satisfies the relation: Vn=55.9; the fifth lens element 740 has negative refractive power and its Abbe number Vn satisfies the relation: Vn=23.4. Vp and Vn satisfy the relations:

Vp−Vn=0.0 (the third lens element 720 and the fourth lens element 730);

Vp−Vn=32.5 (the third lens element 720 and the fifth lens element 740).

In the fourth embodiment of the present imaging lens system, the curvature radius of the object-side surface 701 of the first lens element 700 is R1, the focal length of the imaging lens system is f, and they satisfy the relation: R1/f=0.36.

In the fourth embodiment of the present imaging lens system, on the image-side surface 732 of the fourth lens element 730, there is a point which has a tangent plane perpendicular to the optical axis; the distance between the point and the optical axis is Y' (referring to FIG. 7); the clear aperture radius of the image-side surface 732 of the fourth lens element 730 is Y (referring to FIG. 7); and Y' and Y satisfy the relation: Y'/Y=0.66.

In the fourth embodiment of the present imaging lens system, the image plane 770 is provided with an electronic sensor on which an object is imaged. The on-axis spacing between the object-side surface 701 of the first lens element 700 and the electronic sensor is TTL, half of the diagonal length of the effective pixel area of the electronic sensor is ImgH, and they satisfy the relation: TTL/ImgH=1.62.

In the fourth embodiment of the present imaging lens system, the focal length of the fifth lens element 740 is f5, the focal length of the system is f, and they satisfy the relation: f/f5=−0.14.

In the fourth embodiment of the present imaging lens system, the focal length of the system is f, the focal length of the third lens element 720 is f3, and they satisfy the relation: |f/f3|=1.45.

The detailed optical data of the first embodiment is shown in FIG. 15 (TABLE 7), and the aspheric surface data is shown in FIG. 16 (TABLE 8), wherein the units of the curvature radius, the thickness and the focal length are expressed in mm, and HFOV is half of the maximal field of view.

It is to be noted that TABLES 1-8 (illustrated in FIGS. 9-16 respectively) show different data of the different embodiments; however, the data of the different embodiments are obtained from experiments. Therefore, any imaging lens system of the same structure is considered to be within the scope of the present invention even if it uses different data. The preferred embodiments depicted above are exemplary and are not intended to limit the scope of the present invention. TABLE 9 (illustrated in FIG. 17) shows the data of the respective embodiments resulting from the equations.

What is claimed is:

1. An imaging lens system comprising, in order from an object side to an image side:
   a first lens element with positive refractive power having a convex object-side surface;
   a second lens element with negative refractive power;
   a third lens element with positive refractive power, at least one of the object-side and image-side surfaces thereof being aspheric;
   a fourth lens element, the image-side surface thereof being aspheric and provided with at least one inflection point;
   a fifth lens element having a concave object-side surface, at least one of the object-side and image-side surfaces thereof being aspheric; and
   an aperture stop disposed between an imaged object and the second lens element.

2. The imaging lens system according to claim 1, wherein the fourth lens element has a convex object-side surface and a concave image-side surface.

3. The imaging lens system according to claim 2, wherein the second lens element has concave object-side and image-side surfaces while the third lens element has a concave object-side surface and a convex image-side surface.

4. The imaging lens system according to claim 1, wherein the focal length of the first lens element is f1, the focal length of the third lens element is f3, and they satisfy the relation: $0<f1/f3<1.2$.

5. The imaging lens system according to claim 4, wherein the focal length of the imaging lens system is f, the focal length of the fourth lens element is f4, and they satisfy the relation: $-1.9<f/f4<0.4$.

6. The imaging lens system according to claim 5, wherein the focal length of the imaging lens system is f, the focal length of the fourth lens element is f4, and they satisfy the relation: $-1.7<f/f4<-0.5$.

7. The imaging lens system according to claim 4, wherein the focal length of the first lens element is f1, the focal length of the third lens element is f3, and they satisfy the relation: $0.55<f1/f3<1.0$.

8. The imaging lens system according to claim 4, wherein the fifth lens element has negative refractive power.

9. The imaging lens system according to claim 8, wherein the fifth lens element has a concave image-side surface.

10. The imaging lens system according to claim 4, wherein the focal length of the imaging lens system is f, the focal length of the fifth lens element is f5, and they satisfy the relation: $-0.58<f/f5<0.30$.

11. The imaging lens system according to claim 1, wherein the Abbe number of the first lens element is V1, the Abbe number of the second lens element is V2, and they satisfy the relation: $28.5<V1-V2<45.2$.

12. The imaging lens system according to claim 11, wherein at least one of the third, fourth, and fifth lens elements has positive refractive power with the Abbe number Vp, at least one of the third, fourth, and fifth lens elements has negative refractive power with the Abbe number Vn, and they satisfy the relation: $22.0<Vp-Vn$.

13. The imaging lens system according to claim 1, wherein the curvature radius of the object-side surface of the first lens element is R1, the focal length of the imaging lens system is f, and they satisfy the relation: $0.30<R1/f<0.50$.

14. The imaging lens system according to claim 1, wherein there is a point on the image-side surface of the fourth lens element, the point having a tangent plane perpendicular to the optical axis; the distance between the point and the optical axis is Y'; the clear aperture radius of the image-side surface of the fourth lens element is Y; and Y' and Y satisfy the relation: $0.55<Y'/Y<1.0$.

15. The imaging lens system according to claim 1, wherein at least three of the lens elements are made of plastic, and their object-side and image-side surfaces are both aspheric.

16. The imaging lens system according to claim 15, wherein the lens elements with refractive power are limited to the first, second, third, fourth, and fifth lens elements.

17. The imaging lens system according to claim 1, wherein the aperture stop is disposed between the imaged object and the first lens element.

18. The imaging lens system according to claim 17 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH<1.95$.

19. An imaging lens system comprising, in order from an object side to an image side:
   a first lens element with positive refractive power having a convex object-side surface;
   a second lens element with negative refractive power;
   a third lens element with positive refractive power;
   a fourth lens element with positive or negative refractive power, the image-side surface thereof being aspheric and provided with at least one inflection point; and
   a fifth lens element with positive or negative refractive power having a concave object-side surface, at least one of the object-side and image-side surfaces thereof being aspheric;
   wherein the focal length of the first lens element is f1, the focal length of the third lens element is f3, and they satisfy the relation: $0<f1/f3<1.2$;
   wherein the curvature radius of the object-side surface of the first lens element is R1, the focal length of the imaging lens system is f, and they satisfy the relation: $0.30<R1/f<0.50$;
   wherein the Abbe number of the first lens element is V1, the Abbe number of the second lens element is V2, and they satisfy the relation: $22.0<V1-V2$; and
   wherein the lens elements with refractive power are limited to the first, second, third, fourth, and fifth lens elements.

20. An imaging lens system comprising, in order from an object side to an image side:
   a first lens element with positive refractive power having a convex object-side surface;
   a second lens element with negative refractive power;
   a third lens element with positive or negative refractive power;
   a fourth lens element with positive or negative refractive power, the image-side surface thereof being aspheric and provided with at least one inflection point; and
   a fifth lens element with positive or negative refractive power having a concave object-side surface, at least one of the object-side and image-side surfaces thereof being aspheric;
   wherein the focal length of the imaging lens system is f, the focal length of the third lens element is f3, and they satisfy the relation: $0.2<|f/f3|$;
   wherein the curvature radius of the object-side surface of the first lens element is R1, the focal length of the imaging lens system is f, and they satisfy the relation: $0.30<R1/f<0.50$;
   wherein the Abbe number of the first lens element is V1, the Abbe number of the second lens element is V2, and they satisfy the relation: $22.0<V1-V2$; and
   wherein the lens elements with refractive power are limited to the first, second, third, fourth, and fifth lens elements.

* * * * *